United States Patent Office 2,913,467
Patented Nov. 17, 1959

2,913,467

STEROIDAL BORON COMPOUNDS AND ALCO-HOLS PRODUCED THEREFROM

Raphael Pappo, Skokie, Ill., assignor to G. D. Searle & Co., Chicago, Ill., a corporation of Delaware No Drawing. Application April 22, 1958
Serial No. 730,043

8 Claims. (Cl. 260—397.5)

The present invention relates to a new group of steroids and, more particularly, to steroidal boron compounds and the alcohols produced from them by treatment with alkaline peroxide.

The boron compounds of this invention are compounds of the formula

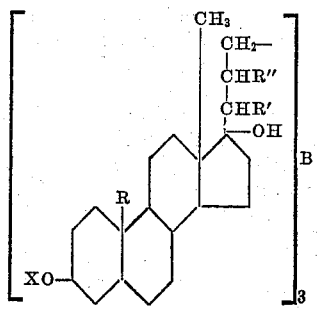

and

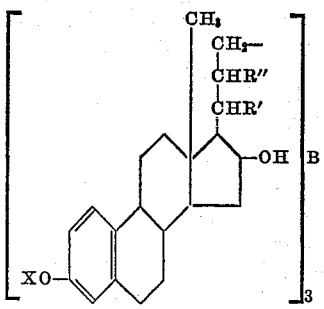

wherein R, R′ and R″ are members of the class consisting of hydrogen and methyl and wherein X is a lower alkyl radial or hydrogen.

The steroidal trialkylboron compounds are converted by alkaline peroxide to the corresponding alcohols of the structural formula

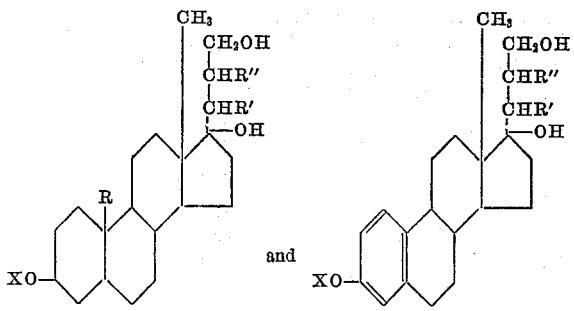

The latter are useful hormonal agents and local anesthetics. Furthermore, they furnish valuable intermediates in the synthesis of other medicinally active substances. Specifically, oxidation with chromic acid yields acids which form spirolactones of the type

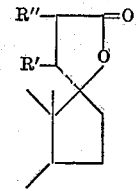

and which J. Cella has found to be potent antagonists of desoxycorticosterone in preventing the sodium retention produced by that hormone.

The acids and their spirolactones can also be formed directly by oxidation of the foregoing boron compounds with chromic acid, typically in acetic acid.

The boron compounds of this invention are produced from the corresponding 17-alkenyl steroids having a substituent in the 17α-position of the structural formula

—CHR′—CR″=CH$_2$ by treatment with at least one-third of a molecular equivalent of aluminum chloride and one equivalent of an alkali metal or alkaline earth metal borohydride and preferably sodium borohydride.

Where the starting material for the preparation of the boron compound is a Δ$^5$-3-ol there results the addition of another boron equivalent at the 6-position and, on treatment with alkaline peroxide, of a 6-hydroxy derivative of the type

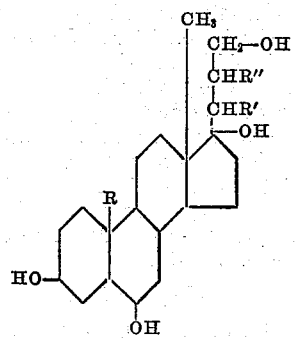

On chromic acid oxidation to effect lactone formation the 3- and 6-hydroxy groups are oxidized to form the 3,6-diketones.

The free phenolic compounds of the type

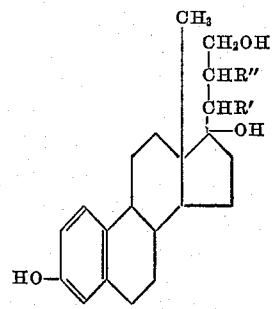

are prepared from the corresponding 3-ethers by alkaline cleavage.

The invention will appear more fully from a consideration of the following examples which are given for purposes of illustration and should not be construed as limiting the invention in spirit or in scope.

*Example 1*

To a solution of 2.81 parts of sodium borohydride and 3.3 parts of aluminum chloride in 68 parts of β, β′-dimethoxydiethyl ether is added one part of 17α-allylestradiol 3-methyl ether and the mixture is stirred for 24 hours at room temperature. An excess of aqueous hydrochloric acid is then carefully added and the resulting solution is extracted with a mixture of ether and benzene. The organic extract is washed with water, dried and concentrated under vacuum to yield tris-[γ-(3-methoxy-17β-hydroxy-1,3,5(10)-estratrien-17-yl)propyl]boron as a gum. The compound has the structural formula

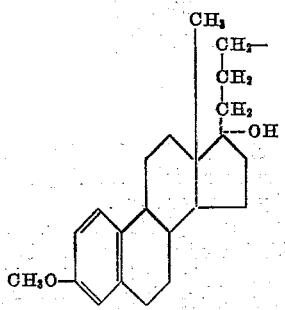

This boron compound is suspended in 40 parts of methanol and treated with 2 parts of 30% aqueous hydrogen peroxide and 10 parts of 10% aqueous sodium hydroxide with agitation. The mixture becomes homogeneous after a few minutes. It is heated on the steam bath until the peroxide is destroyed. Treatment with 2 parts of 30% aqueous hydrogen peroxide and heating on the steam bath to decomposition is repeated. The mixture is then concentrated on the steam bath and cooled. The crystals which form are collected on a filter, washed with water and dried and finally triturated with ethyl acetate. 3-methoxy-17α-(3-hydroxypropyl)-1,3,5-estratrien-17β-ol melts at about 159–160.5° C.

A solution of 0.344 part of this product in 20 parts of acetone is treated with 0.55 part of a solution 8-N in chromic acid and 8-N in sulfuric acid. After 13 minutes at room temperature the mixture is diluted with water and extracted with a mixture of ether and benzene. The organic extracts are washed with water, aqueous potassium bicarbonate solution and then again with water, dried and evaporated to dryness. The crystalline residue is recrystallized from ether and benzene to yield 3-methoxy-17α-(3-carboxypropyl)-1,3,5(10)-estratrien-17β-ol lactone melting at about 150–152° C.

*Example 2*

Estrone methyl ether and crotyl magnesium bromide are reacted according to the procedure described for the preparation of 17α-allylestradiol 3-methyl ether by Colton et al. in the Journal of the Amer. Chem. Soc., vol. 79, page 1123; 1957. To a solution of 14 parts of the resulting 17α-(1-methylallyl)-estradiol 3-methyl ether in 72 parts of β,β'-dimethoxydiethyl ether is added a solution of 13 parts of sodium borohydride and 13 parts of aluminum chloride in 540 parts of β,β'-dimethoxydiethyl ether. The reactants are agitated at room temperatures overnight, then heated at 70–85° C. for 3 hours with continued agitation. The resultant suspension is cooled, whereupon an excess of hydrochloric acid is carefully added. Upon extraction with benzene and removal of solvent from the benzene extract, tris-[γ-(3-methoxy-17β-hydroxy-1,3,5(10)-estratrien-17-yl)butyl]boron is obtained as a gum.

This gummy residue is taken up in 320 parts of ethanol, and to the ethanol solution is added 40 parts of aqueous 30% hydrogen peroxide and 120 parts of aqueous 10% caustic soda. When the resultant exothermic reaction subsides, the mixture is heated at 95–100° C. until the peroxide is destroyed, whereupon this alkaline peroxide treatment is twice repeated and heating at 95–100° C. continued under a nitrogen atmosphere until most of the ethanol is evaporated. The residue, diluted with water and chilled, solidifies. Pressed dry on a filter and washed with water, the resultant 3-methoxy-17α-(1-methyl-3-hydroxypropyl)-1,3,5(10)-estratrien-17β-ol consists of a mixture of isomers which are resolved by trituration with ether. The insoluble isomer, recovered on a filter, melts at approximately 150.5–153° C.

From the mother liquors, by chromatographic adsorption on silica gel, using benzene and ethyl acetate as developing solvents, the second isomer is obtained. Its melting point is 157–159° C. The products have the formula

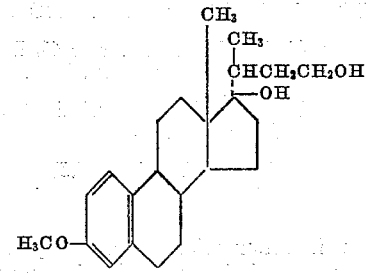

To a solution of 3.8 parts of the 3-methoxy-17α-(1-methyl-3-hydroxypropyl)-1,3,5(10)-estratrien-17β-ol isomer melting at 150.5–153° C. in 160 parts of acetone is added, at room temperatures, 5.6 parts of a solution 8-N in chromic acid and 8-N in sulfuric acid. The reactants are diluted with water, and the resultant mixture is extracted with a mixture of benzene and ether. The extract is washed with aqueous potassium bicarbonate, dried over anhydrous sodium sulfate, and stripped of solvent by distillation in vacuo. Crystallization of the residue from butanone affords stereochemically pure 3-methoxy-17α-(1-methyl-3-carboxypropyl)-1,3,5(10)-estratrien-17β-ol lactone, the melting point of which is 168–170° C.

Oxidation of 8.42 parts of the mixed 3-methoxy-17α-(1-methyl-3-hydroxypropyl)-1,3,5(10)-estratrien-17β-ol isomers of the preceding part of this example by precisely the same technique just set forth affords a mixture of 3-methoxy-17α-(1-methyl-3-carboxypropyl)-1,3,5(10)-estratrien-17β-ol lactone isomers, melting in the range 149–161° C. This mixture is resolved by chromatographic adsorption on aluminum silicate, using benzene and petroleum ether as developing solvents. There is obtained by this means stereochemically pure 3-methoxy-17α-(1-methyl-3-carboxypropyl)-1,3,5(10)-estratrien-17β-ol lactone melting at 184–187° C.

*Example 3*

Estrone ethyl ether and 2-methallyl magnesium chloride are reacted according to the procedure described for the preparation of 17α-allylestradiol 3-ethyl ether in the article by Colton cited in the preceding example. To a solution of 7 parts of the resulting 17α-(2-methylallyl) estradiol 3-ethyl ether in 36 parts of β,β'-dimethoxydiethyl ether there is added a solution of 6.5 parts of sodium borohydride and 6.5 parts of aluminum chloride in 370 parts of β,β'-dimethoxydiethyl ether. After stirring for 12 hours at room temperature, the mixture is heated under stirring for 3 hours at about 80° C. and then chilled and treated with an excess of dilute hydrochloric acid. The resulting mixture is extracted with benzene and the benzene extract is concentrated under vacuum to yield tris-[β-methyl-γ-(3β-ethoxy-17β-hydroxy-1,3,5(10)-estratrien-17-yl)propyl]boron as a resinous residue. The compound has the structural formula

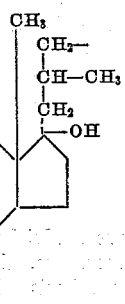

This product is taken up in 150 parts of ethanol and to the resulting solution there are added 20 parts of aqueous 30% hydrogen peroxide and 60 parts of aqueous 10% sodium hydroxide solution. When the resulting exothermic reaction subsides, the mixture is heated on the steam bath until the peroxide is destroyed and this alkaline peroxide treatment is repeated and heating at 95–100° C. continued under a nitrogen atmosphere until most of the ethanol is evaporated. The resulting residue is diluted with water and refrigerated until crystallization occurs. The crystals are collected on a filter and washed with water to yield a mixture of two isomers of 3-ethoxy-17α-(2 - methyl-3-hydroxypropyl)-1,3,5-estratrien-17β-ol. Infrared maxima are observed at 2.92, 3.40, 3.48, 6.20, 6.63, 8.07, and 9.58 microns.

Example 4

A mixture of one part of 3-methoxy-17α-(3-hydroxypropyl)-1,3,5-estratrien-17β-ol and 10 parts of potassium hydroxide in 200 parts of diethylene glycol is refluxed under nitrogen for 6 hours and then cooled and concentrated under vacuum. The residue is taken up in water, washed with ether and the aqueous phase is separated and treated with carbon dioxide. The resulting precipitate is collected on a filter and dried to yield 17α-(3-hydroxypropyl)-1,3,5-estratriene-3,17β-diol. Infrared maxima are observed at 2.7, 2.9, 3.4, 6.2 and 6.64 microns. The compound has the structural formula

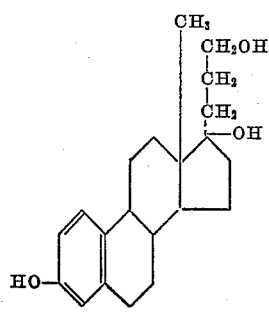

Example 5

A mixture of 4 parts of 17α-allyl-19-nortestosterone, 1 part of a 20% aqueous sodium hydroxide solution, 5 parts of 2% palladium-on-strontium carbonate catalyst and 600 parts of ethanol are maintained in an atmosphere of hydrogen at 25° C. for an hour until one mole of hydrogen is absorbed. The solution is then filtered and the filter cake is washed with ethanol. The filtrate and the washings are combined and concentrated to dryness. The residue is taken up in benzene, filtered to remove the suspension of inorganic material, and applied to a chromatography column packed with an adsorbent containing 15.5% magnesium oxide and 84.5% silicon dioxide. The column is eluted with benzene solutions containing increasing concentrations of ether. Pure benzene elutes the cis-isomer, 17α-allyl-17β-hydroxy-5β-estran-3-one. The trans-isomer, 17α-allyl-17β-hydroxy-5α-estran-3-one is eluted by use of a 5 to 10% solution of ether in benzene.

To a solution of 14 parts of either of these isomers in 72 parts of β,β'-dimethoxydiethyl ether is added a solution of 13 parts of sodium borohydride and 13 parts of aluminum chloride in 540 parts of β,β-dimethoxydiethyl ether. The mixture is stirred for 12 hours and then heated at 80–85° C. for 3 hours with continued agitation. The resultant suspension is cooled and rendered acidic by cautious addition with hydrochloric acid. On extraction with benzene and removal of the solvent there is obtained tris-[γ-(3β,17β-dihydroxyestran - 17 - yl)propyl]boron of the structural formula

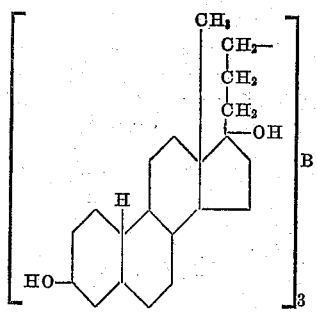

The 5α- or 5β-isomer are obtained depending on the starting material used.

The boron compound is taken up in 320 parts of ethanol and to the resulting solution are added 40 parts of aqueous 30% hydrogen peroxide and 120 parts of aqueous 10% sodium hydroxide. After subsidence of the initial reaction the mixture is heated to 95–100° C. until the peroxide is destroyed and this alkaline peroxide treatment is twice repeated. The mixture is then heated at 95–100° C. under nitrogen to remove the ethanol. The residue is diluted with water and chilled to yield the 17α-(3-hydroxypropyl)estrane-3,17β-diol.

Example 6

When there is substituted in the foregoing procedure for the 17α-allyl-19-nortestosterone the 17α-(methylallyl)-19-nortestosterone described by F. B. Colton in patent application S.N. 690,422, filed on October 16, 1957 and which will issue on June 10, 1958 as U.S. Patent 2,838,530, there is obtained first the tris-[γ-(3β,17β-dihydroxyestran-17-yl)butyl]boron in two isomers. Treatment of each of these two isomers with alkaline peroxide by the procedure of Example 2 yields a mixture of isomers of 17α-(1-methyl-3-hydroxypropyl)estrane-3β,17β-diol of the structural formula

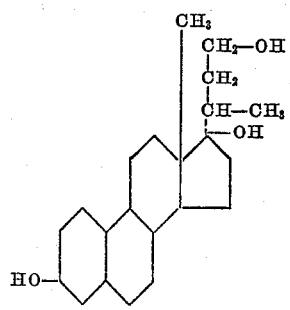

Infrared maxima are observed at 3.00 (broad), 3.4, 6.8, 9.35, 9.5 and 10.00 microns.

Example 7

Substitution in the procedure of the foregoing example of 17α-(2-methylallyl)-19-nortestosterone for the 1-methyllallyl isomer yields first the tris-[β-methyl-γ-(3, 17β - dihydroxyestran - 17 - yl)propyl]boron isomers and then an isomeric mixture of 17α-(2-methyl-3-hydroxypropyl) estrane-3,17-diol of the structural formula

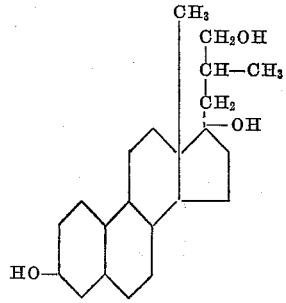

The compound shows infrared maxima at 3.00 (broad), 3.4, 6.8 and 9.5 microns.

Example 8

A solution of 17α-(1-methylallyl)-19-nortestosterone is dissolved in 110 parts of isopropenyl acetate and treated for 48 hours with 0.5 part of p-toluenesulfonic acid monohydrate. A portion of the solvent is removed by slow distillation in the course of an hour and the brown solution is then cooled, diluted with ether, washed with aqueous potassium carbonate, then with water and dried. Solvent is subsequently removed under reduced pressure and the residue is recrystallized from methanol to yield 3β,17β - diacetoxy - 17α - (1-methylallyl)-3,5-estradiene, melting at about 123–128° C.

A solution of one part of this enol acetate in 55 parts of methanol and 20 parts of ether is added portionwise in the course of 4-hour period to a stirred solution of 4.3 parts of sodium borohydride in 40 parts of water and 100 parts of methanol with ice cooling. The mixture is then stirred at room temperature for 5 additional hours and permitted to stand at 0–5° C. for 12 hours. The homogeneous solution is treated with a slight excess of aqueous hydrochloric acid and concentrated at room temperature under vacuum. The resulting aqueous suspension is extracted with a mixture of ether and benzene. The combined organic extracts are washed with aqueous sodium hydroxide and then with water, dried and concentrated under vacuum. The residue is recrystallized from ethanol to yield 17α-(1-methylallyl)-17β-acetoxy-19-nor-5-androsten-3-ol melting at about 152–157° C.

A solution of 2.2 parts of the crude reaction product in 80 parts of ethanol is refluxed with 3 parts of sodium hydroxide in 20 parts of water for 48 hours. The mixture is concentrated to a small volume and cooled. The crystalline product is collected on a filter, washed with water and dried. It is then applied in benzene solution to a chromatography column containing a 5:1 mixture of silicon dioxide and magnesium oxide. The benzene solution elutes 17α-(1-methylallyl)-19-nor-5-androstene-3β,17β-diol which, on recrystallization from a mixture of methanol and butanone, forms a methanol solvate melting at about 150–151.5° C.

A solution of 1 part of this compound in 10 parts of β,β'-dimethoxydiethyl ether is added to a solution of 1.63 parts of sodium borohydride and 1.66 parts of aluminum chloride in 70 parts of β,β'-dimethoxydiethyl ether. The mixture is heated under nitrogen for 4 hours at 70–85° C. and then stirred for 15 hours at room temperature. The white suspension is treated with excess aqueous hydrochloric acid and extracted with benzene. The benzene extracts are concentrated to dryness to yield the boron complex.

This boron complex is dissolved in ethanol and treated with 30% aqueous hydrogen peroxide in the presence of aqueous sodium hydroxide. The mixture is concentrated on the steam bath under nitrogen and then extracted with a mixture of ethyl acetate and ether. The extract is concentrated to dryness to yield 17α-(1-methyl-3-hydroxypropyl)estrane-3,6,17-triol as an amorphous gum which still contains some boron. The compound has the structural formula

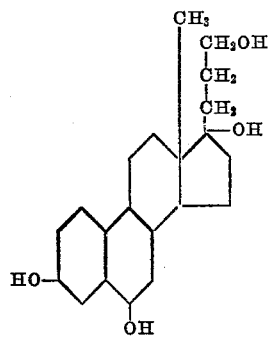

The tetrol thus obtained is dissolved in 80 parts of acetone and treated at 15–17° C. with 2.2 parts of a solution 8-N in chromic acid and 8-N in sulfuric acid. After 3 minutes the mixture is diluted with water and extracted with a mixture of ether and benzene. The extract is washed with aqueous potassium bicarbonate and then with water, dried and evaporated to dryness. The amorphous residue is chromatographed on silica gel. The column is developed with benzene solutions containing increasing concentrations of ethyl acetate. A 15–25% solution of ethyl acetate in benzene yields 17α-(1-methyl-3-carboxypropyl) - 17β - hydroxy - 1,3,5(10) - estratriene-3,6-dione lactone melting at about 222–226° C. The infrared absorption spectrum shows no hydroxyl absorption at 2.8 to 3 microns, a strong peak is seen at 5.65 microns and a very strong peak at 5.82 microns.

Example 9

In the procedure of the foregoing example there is substituted as the starting material the 17α-(2-methylallyl)-19-nortestosterone. Using identical operating conditions there is obtained 17α-(2-methyl-3-hydroxypropyl)estrane-3,6,17-triol of the structural formula

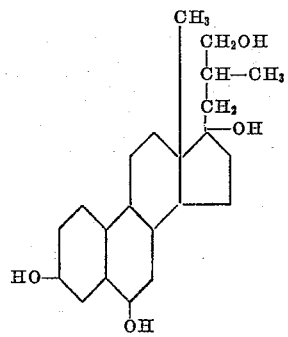

Infrared maxima are seen at 3.4, 6.8 and 9.5 and a very strong band at 3.00 microns.

Example 10

To a solution of 28 parts of 17α-allyl-5-androstene-3β,17β-diol in 150 parts of β,β'-dimethoxydiethyl ether is added a solution of 26 parts of sodium borohydride and 26 parts of aluminum chloride in 1100 parts of β,β'-dimethoxydiethyl ether. The reactants are agitated at room temperature for 12 hours and then heated at 70–85° C. for 3 hours with continued agitation. The resulting suspension is cooled and acidified by cautious addition of hydrochloric acid. On extraction with benzene and removal of solvent from the benzene extract the boron compound is obtained. This gummy boron compound is taken up in 650 parts of ethanol and to the ethanol solution are added 80 parts of aqueous 30% hydrogen peroxide and 250 parts of aqueous 10% caustic soda solution. When the resulting exothermic reaction appears completed, the mixture is heated at 95° C. until the peroxide is destroyed and the alkaline peroxide treatment is twice repeated. The mixture is then heated at 100° C. until most of the solvent is evaporated. The residue, diluted with water and chilled, solidifies. There is thus obtained 17α-(3-hydroxypropyl)androstane-3,6,17-triol of the structural formula

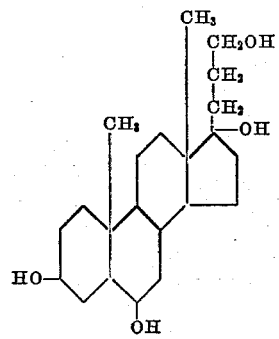

Infrared maxima are seen at 3.4, 6.8 and 9.5 and a very strong band at 3.00 microns.

What is claimed is:
1. A boron compound of the formula

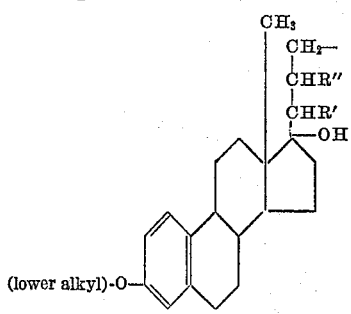

wherein one of the radicals R' and R" is hydrogen and the other is a member of the class consisting of hydrogen and methyl radicals.

2. Tris-[γ-(3 - methoxy - 17β - hydroxy-1,3,5(10)-estratrien-17-yl)propyl]boron.

3. Tris-[γ-(3 - methoxy - 17β - hydroxy-1,3,5(10)-estratrien-17-yl)butyl]boron.

4. A compound formula

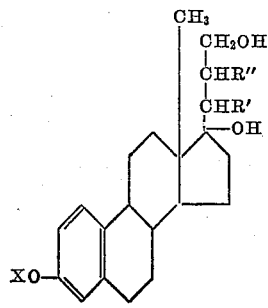

wherein one of the radicals R' and R" is hydrogen and the other is a member of the class consisting of hydrogen and methyl radicals and X is a member of the class consisting of hydrogen and lower alkyl groups.

5. 3-methoxy-17α-(3 - hydroxypropyl)-1,3,5(10)-estratrien-17β-ol.

6. 3-methoxy-17α-(1 - methyl - 3-hydroxypropyl)-1,3,5(10)estratrien-17β-ol.

7. A compound of the formula

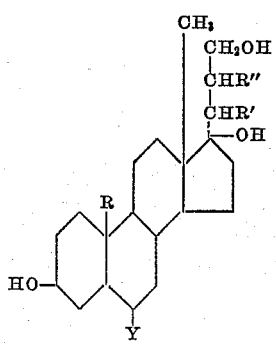

wherein R is a member of the class consisting of hydrogen and methyl, one of the radicals R' and R" is hydrogen and the other is a member of the class consisting of hydrogen and methyl and Y is a member of the class consisting of hydrogen and hydroxy.

8. 17α-(1-methyl-3-hydroxypropyl)estrane-3,6,17-triol.

References Cited in the file of this patent
UNITED STATES PATENTS
2,345,216   Reichstein _____ Mar. 28, 1944